Aug. 1, 1944.  J. A. TOLMAN  2,354,931
FILTERING MEMBER
Filed June 24, 1940  2 Sheets-Sheet 1

INVENTOR
John A. Tolman.
BY Dike, Calver & Gray
ATTORNEYS.

Aug. 1, 1944. J. A. TOLMAN 2,354,931
FILTERING MEMBER
Filed June 24, 1940 2 Sheets-Sheet 2

INVENTOR
John A. Tolman.
BY Dike, Calver & Gray
ATTORNEYS.

Patented Aug. 1, 1944

2,354,931

UNITED STATES PATENT OFFICE 2,354,931

FILTERING MEMBER

John A. Tolman, Detroit, Mich.

Application June 24, 1940, Serial No. 342,046

3 Claims. (Cl. 210—169)

This invention relates to filters and more particularly to filtering members actually effecting the separation of solids from fluids and particularly liquids, which members are often referred to in the art as filter mediums.

One of the objects of the present invention is to provide a filtering member which possesses the advantage of uniform and controlled porosity, means being provided to seal the pores of increased size which may be present near the edges of the filtering member adjacent its retaining means.

Another object of the invention is to provide an improved filtering member which may be made of a standardized size, with the aid of which it is possible to build up filtering members of any desired area to meet varied requirements as to the filtering capacity thereof.

A further object of the present invention is to provide an improved filtering member which has such fine uniform porosity throughout as to be able to separate out from a liquid, solids of microscopic dimensions, such for instance as colloids, which heretofore could not be separated by any filtration process, as a consequence of which various chemical processes or sedimentation, often very tedious or expensive, heretofore had to be relied upon for their separation.

Other objects and advantages of this invention will appear in the following description and appended claims, reference being had to the accompanying drawings forming a part of this specification wherein like reference characters designate corresponding parts in the several views.

Figure 1:
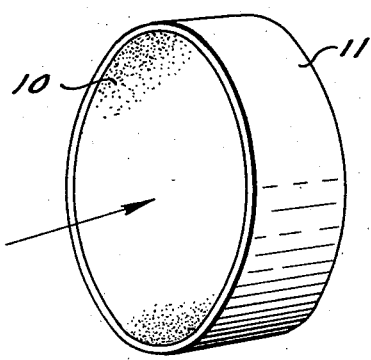
Fig. 1 is a perspective view showing a filtering member constructed in accordance with one embodiment of the present invention.

In the drawings there is shown, by way of example, a number of filtering members constructed in accordance with the present invention.

Figure 2:
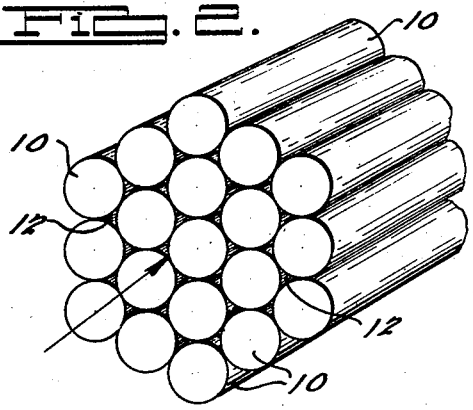
Fig. 2 is an isometric view illustrating a group of strands and their relative arrangement.

Fig. 1 illustrates a filtering member comprising a plurality of strands 10 arranged in longitudinal contact and parallel to each other and encircled by a preferably metallic retainer ring 11 adapted to maintain the strands under constant transverse pressure sufficient to preserve the unity of the entire member. Fig. 2 illustrates the arrangement of separate strands and their character. As can be seen from said figure, the strands are of a cylindrical shape, although prismatic shape may be used in some instances. The strands are arranged parallel to each other and parallel to the direction of the flow of liquid. Filtration channels 12 are formed between the separate strands, and if the strands are of substantially uniform thickness throughout their length and of approximately equal cross sections, the cross sectional area of said filtering channels is constant and definite. With cylindrical strands the area of the spandrel or cross section of the filtering channels formed between the strands is equal approximately to .162 $r^2$ where $r$ stands for the value of the radius of the strands. By virtue of such a construction a definite and controlled porosity is effected and the sizes of the filtering channels may be made so minute as to be much smaller than channels or capillaries of the filtering members or mediums heretofore known. Using extruded glass strands it is possible to have as many as approximately two hundred million pores per square inch. These pores may be of any desired length, and in the case just given they will be one two hundred and fifty-three billionth of a square inch 1/253000000000 in area and are substantially identical in size and shape. In most cases strands of less than .001 of an inch in diameter are preferred.

Figure 4:
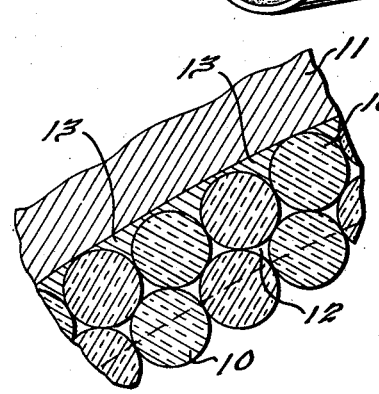
Fig. 4 is a fragmentary sectional view taken in the direction of the arrows on the section plane passing through line 4—4 of Fig. 3.
Figure 3:
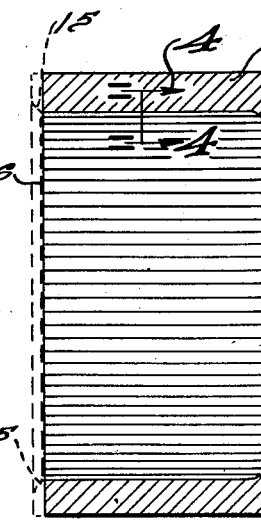
Fig. 3 is a view showing a filtering member embodying the present invention, in longitudinal section.

From an examination of Fig. 4 it can be clearly seen that the cross section of channels 13 which are formed between the outside strands 10 and the inner surface of the retainer ring 11 are larger than the cross section of the channels 12. In some instances, such for instance as when the liquid is filtered to remove dangerous bacteria, presence of such increased channels may be undesirable. In Fig. 3 there is illustrated one way in which these channels may be eliminated. In general these channels may be closed either by filling them with some substance, by applying a coating of the substance on the outside of the bunch of the strands before they are introduced into the retainer 11, or by applying the coating on the inner surface of the retainer 11; or these channels 13 may be closed with the aid of means such as a lip 14. When the latter method is used, the retainer 11 provided with a lip 14 may be chamfered at its opposite end as indicated at 15 and made slightly longer than the strands themselves. After the strands are introduced into the shell 11 the opposite faces 16 and 17 of the member are ground flush with the retainer 11, thus providing a smooth surface without any protruding parts thereon. In some instances it may be desirable to grind only one face, namely one at which the cake builds up. When so finished, the filtering member resembles in its appearance a disk made of strong homogeneous material and it can be very conveniently handled in assembly and disassembly, in washing, cleaning or scraping. With conventional filtering members or mediums, such as cloth, fabric or screening, scraping of the filter rapidly wears out the filtering mediums and drives the cake into the pores of the filtering member without any practical possibility of removing parts of the cake therefrom. With my improved construction scraping of the member is made very easy and effective. When glass strands of less than one thousandth of an inch in diameter are used, the filtering member resembles in its appearance, a plate of ground glass and is very convenient to handle.

Figure 5:
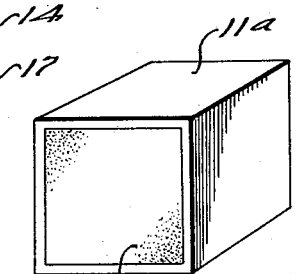
Fig. 5 is an isometric view of a filtering member having a prismatic retainer.
Figure 6:
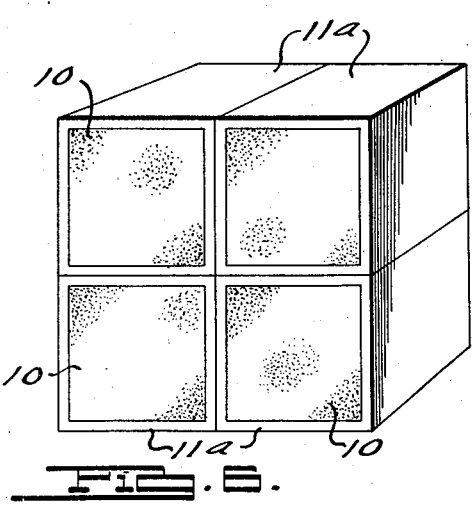
Fig. 6 illustrates a filtering wall built up of a plurality of filtering members illustrated in Fig. 5.
Figure 7:
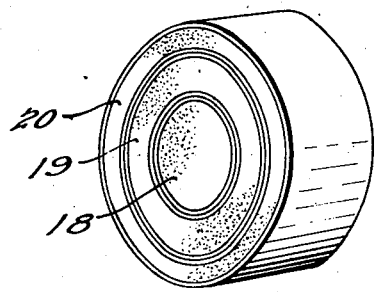
Fig. 7 is a perspective view showing a built up filtering member of a circular cross section composed of a plurality of concentric filtering members.

Fig. 1 illustrates a single filter member of a cylindrical shape. In many instances, structural considerations make filtering members of rectangular and particularly square cross section very advantageous. Such a member is illustrated in Fig. 5. With the aid of such a member filtering walls of any practical size may be built up by assembling a group of separate members and holding them together with the aid of suitable retaining means. Fig. 7 illustrates a filtering wall built up of a plurality of concentric annular filtering members. In this case while the central member generally indicated by the numeral 18 is similar in its construction to the member illustrated in Fig. 1, the outside members 19 and 20 have inside and outside retainer rings with the space between them packed with the parallelly arranged strands. Such filtering members are particularly adapted to resist high pressures.

Figure 8:
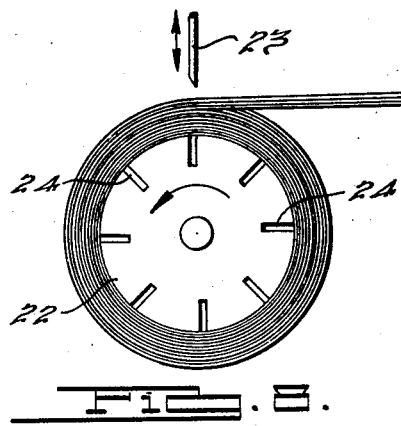
Fig. 8 illustrates the method of extruding softened material and winding the same on a drum to produce fibers of a desired thickness.

In the majority of cases the strands used have to be of such a small diameter that usual processes of manufacturing such strands become inadequate. Fig. 8 illustrates a method of producing exceedingly fine strands from a variety of materials. In accordance with this method, a plurality of fibres or strands are extruded from a die 21, and their free ends are secured to a drum 22 which is rotated at a predetermined speed. With circular die openings the strands will be substantially cylindrical in their form, and their thickness will depend upon the rotative speed of the drum 22. The faster the speed of the drum 22, the thinner the strands produced. If the temperature of the extruded material and, consequently, the consistency thereof and the rotative speed of the drum 22 are kept constant, the diameters of the strands will also be constant, provided the temperature of the surrounding air does not fluctuate beyond certain limits. The distance between the die 21 and the drum 22 is so selected that the strands have enough time to harden and cool down sufficiently to prevent their distortion as they are wound up on the drum 22.

After a layer or layers of strands of a predetermined thickness are wound on the drum 22, they are cut substantially perpendicularly to the strands with the aid of a cutter 23 of any suitable construction, which cutter may be adapted to enter the recesses or slots 24 provided in the drum to ensure complete cutting of the strand layer or layers. Thereupon the strands which have been cut to predetermined length as explained, are removed from the drum and may be stored in large quantities. Also they may be immediately separated into bunches or fagots of predetermined thickness, straightened and introduced into shells of any desired construction, wherein they are compressed to produce a proper arrangement of the separate strands and to form capillary channels by bringing separate strands into actual longitudinal contact.

Figure 9:
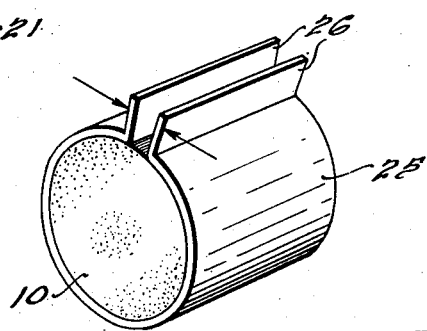
Fig. 9 illustrates a filtering member with a contractible shell.

Fig. 9 illustrates a contractible cylindrical shell 25 split along one of its sides and provided with lips 26. When the shell 25 is slightly expanded a proper quantity of strands is introduced therein and thereupon the lips 26 are brought and secured together, thus compressing the strands.

In many cases the presence of the lips 26 may be considered objectionable. For producing a member of the character illustrated in Fig. 1, it is preferred to heat the metal retainer ring 11 thus expanding the same, introducing the strands into the ring so expanded and thereupon permitting the retainer 11 to cool down and shrink or contract around the strands, thus permanently compressing the same. In like manner the rectangular metal retainer 11a of Fig. 5 may be heated to expand it sufficiently to receive the strands and then heat-shrunk to clamp the strands tight under transverse compression. Polishing the faces of the member, if desired, may be done after the member has cooled down.

Figure 10:
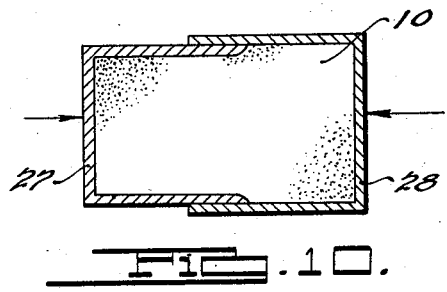
Fig. 10 illustrates a filtering member having its strands compressed between two channel members, said figure illustrating the strands and the channels before the same are compressed.
Figure 11:
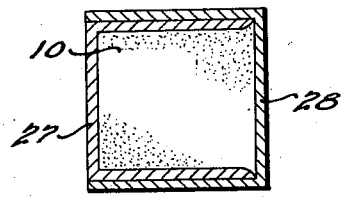
Fig. 11 illustrates the member of Fig. 10 after said member is brought into its final shape.
Figure 12:
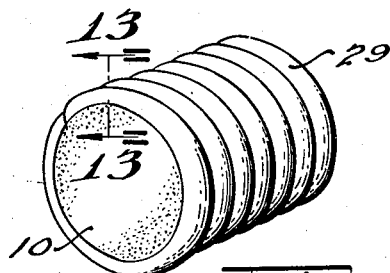
Fig. 12 illustrates in perspective a filtering member in which the retainer is in the form of a flexible element wound around the strands.
Figure 13:
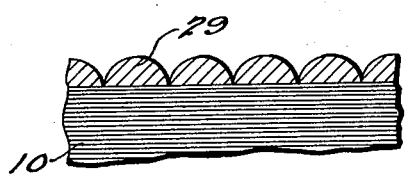
Fig. 13 is a fragmentary sectional view taken in the direction of the arrows on the section plane passing through the section line 13—13 of Fig. 12.

Figs. 10 and 11 illustrate a member in which a predetermined quantity of strands is compressed between channels 27 and 28. Fig. 10 illustrates the member as the compressing operation commences, while Fig. 11 shows the finished member in which the transversely telescoped channels 27 and 28 may be secured in any desired manner to prevent their relative displacement. Figs. 12 and 13 illustrate a filtering member in which the retainer means are in the form of a flexible element 29 wound around a bunch of strands. I prefer to use metal wire of semi-circular cross section with the flat side of said wire contacting the strands.

Figure 14:
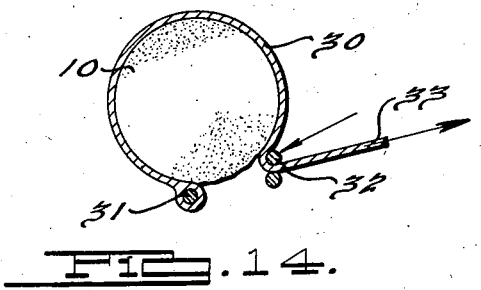
Fig. 14 illustrates the method of compressing the fibres into a cylindrical bunch or fagot.

Fig. 14 illustrates a method and apparatus for compressing a quantity of strands into a substantially cylindrical bunch for introduction into a thermally expanded shell such as is used for producing members of the character illustrated in Fig. 1, or for preparing a bunch of strands for winding a member, similar to the member 20, around them. The structure illustrated in Fig. 14 comprises a flexible member such as a suitable spring or strong sheet 30 of suitable material secured to a fixed rod 31. Force in the direction of the arrow is applied to a movable rod 32 while the end 33 of the member 30 is pulled as indicated by an arrow. As has been shown by actual experience, the mass of strands will gradually come to a practically perfect cylindrical shape and become ready for introduction as a unit into a retainer of any desirable construction.

Although the present filtering member is preferably constructed of fine glass strands or fibers it will be understood that in its broader aspects the invention contemplates the use of strands or fibers of various compositions suitable to carry out the purposes and results desired. It is considered that strands or fibers may be employed which are formed from various minerals, cellulosic materials, metal and plastics including rubber.

I claim:

1. A filtering member comprising a multiplicity of cylindrical strands disposed in rows and in direct contact relation to each other, one strand of a row being in contact with two strands of an adjacent row, a retainer member adapted to encircle said strands and to maintain them under transverse pressure to preserve said relation, and a filler closing the filtration channels between the outside strands and the inner surface of said retainer member.

2. A filtering member comprising a multiplicity of cylindrical strands disposed in direct contact relation to each other, a retainer member adapted to encircle said strands and to maintain them under transverse pressure to preserve said relation, and a filler closing the filtration channels between the outside strands and the inner surface of said retainer member.

3. A filtering member comprising a multiplicity of cylindrical strands disposed in rows in direct contact relation to each other, a metal retainer member heat-shrunk around said strands and maintaining the same under transverse pressure sufficient to preserve said relation, and a filler closing the filtration channels between the outside strands and the inner surface of said retainer member.

JOHN A. TOLMAN.